US011961470B2

(12) United States Patent
Yang et al.

(10) Patent No.: US 11,961,470 B2
(45) Date of Patent: Apr. 16, 2024

(54) SENSING CIRCUIT AND CORRECTION METHOD THEREOF, PIXEL DRIVING MODULE AND SENSING METHOD THEREOF, AND DISPLAY APPARATUS

(71) Applicant: BOE TECHNOLOGY GROUP CO., LTD., Beijing (CN)

(72) Inventors: Fei Yang, Beijing (CN); Tangxiang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 17/771,946

(22) PCT Filed: Jun. 3, 2021

(86) PCT No.: PCT/CN2021/098116

§ 371 (c)(1),
(2) Date: Apr. 26, 2022

(87) PCT Pub. No.: WO2021/244607

PCT Pub. Date: Dec. 9, 2021

(65) Prior Publication Data

US 2023/0005422 A1 Jan. 5, 2023

(30) Foreign Application Priority Data

Jun. 4, 2020 (CN) ........................ 202010501623.2

(51) Int. Cl.

*G09G 3/3233* (2016.01)
*G09G 3/20* (2006.01)
*G09G 3/3266* (2016.01)

(52) U.S. Cl.

CPC ......... *G09G 3/3233* (2013.01); *G09G 3/2096* (2013.01); *G09G 3/3266* (2013.01);
(Continued)

(58) Field of Classification Search

CPC .. G09G 3/3233; G09G 3/2096; G09G 3/3266; G09G 2300/0828;
(Continued)

(56) References Cited

U.S. PATENT DOCUMENTS

2015/0029171 A1 1/2015 Jo
2015/0294626 A1 10/2015 Bi et al.
(Continued)

FOREIGN PATENT DOCUMENTS

CN 101950533 A 1/2011
CN 102968954 A 3/2013
(Continued)

OTHER PUBLICATIONS

China Patent Office, First Office Action dated Mar. 30, 2023 for application No. CN202010501623.2.

*Primary Examiner* — Kenneth B Lee, Jr.
(74) *Attorney, Agent, or Firm* — HOUTTEMAN LAW LLC

(57) ABSTRACT

A sensing circuit and a correction method thereof, a pixel driving module and a sensing method thereof, and a display apparatus, the sensing circuit includes: an operation amplifier (AMP), an integration capacitor (Cfb), a first switch (S1), a second switch (S2), a third switch (S3), a fourth switch (S4), a fifth switch (S5) and a sixth switch (S6).

15 Claims, 8 Drawing Sheets

(52) U.S. Cl.
CPC ............... *G09G 2300/0828* (2013.01); *G09G 2300/0842* (2013.01); *G09G 2310/0291* (2013.01); *G09G 2310/08* (2013.01); *G09G 2320/043* (2013.01); *G09G 2360/14* (2013.01); *G09G 2360/16* (2013.01)

(58) Field of Classification Search
CPC ... G09G 2300/0842; G09G 2310/0291; G09G 2310/08; G09G 2320/043; G09G 2360/14; G09G 2360/16
See application file for complete search history.

(56) References Cited

U.S. PATENT DOCUMENTS

| | | | | |
|---|---|---|---|---|
| 2017/0256199 | A1 | 9/2017 | Bi et al. | |
| 2018/0005559 | A1 | 1/2018 | Chaji et al. | |
| 2018/0144683 | A1* | 5/2018 | Shin | G09G 3/3225 |
| 2018/0254006 | A1* | 9/2018 | Hwang | H01L 27/124 |

FOREIGN PATENT DOCUMENTS

| | | | |
|---|---|---|---|
| CN | 104751782 | A | 7/2015 |
| CN | 105280140 | A | 1/2016 |
| CN | 105741782 | A | 7/2016 |
| CN | 206946907 | U | 1/2018 |
| CN | 107924660 | A | 4/2018 |
| CN | 108074524 | A | 5/2018 |
| CN | 108205391 | A | 6/2018 |
| CN | 108231008 | A | 6/2018 |
| CN | 108399889 | A | 8/2018 |
| CN | 109308879 | A | 2/2019 |
| CN | 109935182 | A | 6/2019 |
| CN | 110164374 | A | 8/2019 |
| CN | 111028783 | A | 4/2020 |
| CN | 111554220 | A | 8/2020 |
| KR | 101549343 | B1 | 9/2015 |

* cited by examiner

SENSING CIRCUIT AND CORRECTION METHOD THEREOF, PIXEL DRIVING MODULE AND SENSING METHOD THEREOF, AND DISPLAY APPARATUS

CROSS-REFERENCE TO RELATED APPLICATIONS

The present application claims the priority of the Chinese Patent Application No. 202010501623.2, filed with the China National Intellectual Property Administration on Jun. 4, 2020, the content of which is incorporated herein by reference in its entirety.

TECHNICAL FIELD

The present disclosure belongs to the field of display technology, and in particular, to a sensing circuit and a correction method thereof, a pixel driving module and a sensing method thereof, and a display apparatus.

BACKGROUND

Organic Light-Emitting Diode (OLED) display apparatuses are widely used due to the advantages of wide color gamut, wide viewing angle, thinness, lightness, low power consumption, high contrast, and flexibility, and are gradually becoming the development trend of display technology in the future. Due to the defects of the processes for forming oxides in manufacturing a large-sized organic light emitting diode display apparatus, characteristics of a transistor or of a light emitting device in a resulting pixel circuit are unstable. In the related art, an external sensing method is generally used for compensation on the aging of the transistor or of the light emitting device in the pixel circuit, so as to ensure normal display of the organic light emitting diode display apparatus.

SUMMARY

In an aspect, a sensing circuit is provided, including: an operation amplifier, an integration capacitor, a first switch, a second switch, a third switch, a fourth switch, a fifth switch, and a sixth switch, wherein the operation amplifier has an in-phase input terminal connected to a first node via the first switch, an anti-phase input terminal connected to a second node, and an output terminal connected to a third node; the integration capacitor has a first electrode connected to the second node, and a second electrode connected to the third node; the first node is connected to a sensing line via the second switch, and is connected to a first signal terminal via the third switch; the second node is connected to the sensing line via the fourth switch, and is connected to a second signal terminal via the fifth switch; the third node is connected to a signal output terminal of the sensing circuit; and the second node is connected to the third node via the sixth switch.

In some embodiments, the sensing circuit further includes: an analog-to-digital converter having a first terminal connected to the third node and a second terminal connected to the signal output terminal of the sensing circuit.

In some embodiments, the first signal terminal is configured to provide a constant voltage signal, and the second signal terminal is configured to provide a constant current signal.

In an aspect, a pixel driving module is provided, including the above sensing circuit and a pixel circuit, wherein the pixel circuit includes a driving unit, a light emitting unit, a data writing unit, a storage unit, and a sensing unit, wherein the driving unit has a control terminal connected at a fifth node to a second terminal of the data writing unit and a first terminal of the storage unit, a first terminal connected to a first voltage terminal, and a second terminal connected at a fourth node to a first terminal of the light emitting unit, a first terminal of the sensing unit and a second terminal of the storage unit; the data writing unit has a control terminal connected to a first gate line terminal and a first terminal connected to a data line terminal; the light emitting unit has a second terminal connected to a second voltage terminal; and the sensing unit has a control terminal connected to a second gate line terminal, and a second terminal connected to the sensing line.

In some embodiments, the driving unit includes: a first transistor having a gate used as the control terminal of the driving unit and connected to the fifth node, a first electrode used as the first terminal of the driving unit and connected to the first voltage terminal, and a second electrode used as the second terminal of the driving unit and connected to the fourth node; the data writing unit includes: a second transistor having a gate used as the control terminal of the data writing unit and connected to the first gate line terminal, a first electrode used as the first terminal of the data writing unit and connected to the data line terminal, and a second electrode used as the second terminal of the data writing unit and connected to the fifth node; the storage unit includes: a storage capacitor having a first electrode used as the first terminal of the storage unit and connected to the fifth node, and a second electrode used as the second terminal of the storage unit and connected to the fourth node; the light emitting unit includes: a first electrode used as the first terminal of the light emitting unit and connected to the fourth node, and a second electrode used as the second terminal of the light emitting unit and connected to the second voltage terminal; and the sensing unit includes: a third transistor having a gate used as the control terminal of the sensing unit and connected to the second gate line terminal, a first electrode used as the first terminal of the sensing unit and connected to the fourth node, and a second electrode used as the second terminal of the sensing unit and connected to the sensing line.

In an aspect, a display apparatus is provided, including the above pixel driving module, wherein the display apparatus further includes: a display panel, a timing controller, a source driver, a gate driver, and a memory; the display panel is connected to the source driver and the gate driver, the timing controller is connected to the source driver, the gate driver, and the memory, the sensing circuit in the pixel driving module is in the source driver, the pixel circuit in the pixel driving module is in the display panel, and the memory stores a threshold voltage and mobility of the first transistor, and luminous efficiency of the light emitting unit.

In some embodiments, a correction method for the above sensing circuit is provided, including: supplying a first voltage signal from the first signal terminal to the anti-phase input terminal and the output terminal of the operation amplifier by controlling the second switch, the third switch, the fourth switch and the sixth switch to be turned on and the first switch and the fifth switch to be turned off; acquiring a first digitized output voltage signal at the second terminal of the analog-to-digital converter; and calculating a correction value of the analog-to-digital converter according to a first digitized voltage signal obtained after performing digital processing on the first voltage signal and the first digitized output voltage signal.

In some embodiments, the correction method further includes calculating a correction value of the operation amplifier, which includes: supplying a second voltage signal from the first signal terminal to the in-phase input terminal of the operation amplifier by controlling the first switch, the third switch and the sixth switch to be turned on, and the second switch, the fourth switch and the fifth switch to be turned off; acquiring a second digitized output voltage signal at the second terminal of the analog-to-digital converter; and calculating a correction value of the operation amplifier according to a second digitized voltage signal obtained after performing digital processing on the second voltage signal, the second digitized output voltage signal and the correction value of the analog-to-digital converter.

In some embodiments, the correction method further includes calculating a correction value of the integration capacitor, which includes: supplying a third voltage signal from the first signal terminal to the in-phase input terminal of the operation amplifier and supplying a first current signal from the second signal terminal to the integration capacitor and the anti-phase input terminal of the operation amplifier by controlling the first switch, the third switch and the fifth switch to be turned on and the second switch, the fourth switch and the sixth switch to be turned off; acquiring a third digitized output voltage signal at the second terminal of the analog-to-digital converter and a third digitized input voltage signal at the first terminal of the analog-to-digital converter; and calculating a correction value of the integration capacitor according to a third digitized voltage signal obtained after performing digital processing on the third voltage signal, the third digitized output voltage signal, the third digitized input voltage signal, and a capacitance of the integration capacitor.

In an aspect, a correction method for the above sensing circuit is provided, including: supplying a second voltage signal from the first signal terminal to the in-phase input terminal of the operation amplifier by controlling the first switch, the third switch and the sixth switch to be turned on and the second switch, the fourth switch and the fifth switch to be turned off; acquiring a second output voltage signal at the output terminal of the operation amplifier; and calculating a correction value of the operation amplifier according to the second voltage signal and the second output voltage signal.

In an aspect, a correction method for the above sensing circuit is provided, including: supplying a third voltage signal from the first signal terminal to the in-phase input terminal of the operation amplifier, and supplying a first current signal from the second signal terminal to the integration capacitor and the anti-phase input terminal of the operation amplifier, by controlling the first switch, the third switch, and the fifth switch to be turned on and the second switch, the fourth switch, and the sixth switch to be turned off; acquiring a third output voltage signal at the output terminal of the operation amplifier; and calculating a correction value of the integration capacitor according to the third voltage signal, the third output voltage signal, and a capacitance of the integration capacitor.

In an aspect, a sensing method of a threshold voltage of the above pixel driving module is provided, including: in a first reset phase, inputting a turn-on signal to the gate of the second transistor and the gate of the third transistor via the first gate line terminal and the second gate line terminal, respectively; controlling the second switch and the third switch to be turned on and the first switch, the fourth switch, the fifth switch and the sixth switch to be turned off; and inputting a first data signal to the first electrode of the second transistor via the data line terminal, such that a signal through the first signal terminal is written into the sensing line to reset the sensing line, and the first data signal is written into the storage capacitor; in a first charging phase, inputting a turn-on signal to the gate of the second transistor and the gate of the third transistor via the first gate line terminal and the second gate line terminal, respectively; controlling the first switch, the second switch, the third switch, the fourth switch, the fifth switch and the sixth switch to be turned off, such that a signal through the first voltage terminal is written into the sensing line; and in a first sensing phase, controlling the fourth switch and the sixth switch to be turned on and the first switch, the second switch, the third switch and the fifth switch to be turned off; not inputting a turn-on signal to the gate of the second transistor and the gate of the third transistor via the first gate line terminal and the second gate line terminal, respectively; and acquiring a voltage signal at the output terminal of the operation amplifier, so as to calculate a threshold voltage of the first transistor according to the first data signal and the voltage signal at the output terminal of the operation amplifier.

In some embodiments, the sensing method further includes: inputting the voltage signal at the output terminal of the operation amplifier to an analog-to-digital converter to convert the voltage signal at the output terminal of the operation amplifier into a digitized voltage signal, and calculating the threshold voltage of the first transistor according to a first digitized data signal obtained after performing digital processing on the first data signal and the digitized voltage signal at the output terminal of the operation amplifier.

In an aspect, a sensing method of mobility of the above pixel driving module is provided, including: in a second reset phase, inputting a turn-on signal to the gate of the second transistor and the gate of the third transistor via the first gate line terminal and the second gate line terminal, respectively; controlling the second switch and the third switch to be turned on and the first switch, the fourth switch, the fifth switch and the sixth switch to be turned off; and inputting a second data signal to the first electrode of the second transistor via the data line terminal, such that a signal through the first signal terminal is written to the sensing line and the second data signal is written to the storage capacitor; in a second charging phase, inputting a turn-on signal to the gate of the third transistor via the second gate line terminal; not inputting a turn-on signal to the gate of the second transistor via the first gate line terminal; and controlling the first switch, the second switch, the third switch, the fourth switch, the fifth switch and the sixth switch to be turned off, such that a signal through the first voltage terminal is written to the sensing line; and in a second sensing phase, controlling the first switch, the third switch and the fourth switch to be turned on and the second switch, the fifth switch and the sixth switch to be turned off; not inputting a turn-on signal to the gate of the second transistor and the gate of the third transistor via the first gate line terminal and the second gate line terminal, respectively; and acquiring a voltage signal at the output terminal of the operation amplifier, so as to calculate the mobility of the first transistor according to the second data signal and the voltage signal at the output terminal of the operation amplifier.

In some embodiments, the sensing method further includes: inputting the voltage signal at the output terminal of the operation amplifier to an analog-to-digital converter to convert the voltage signal at the output terminal of the operation amplifier into a digitized voltage signal, and calculating the mobility of the first transistor according to a second digitized data signal obtained after performing digital processing on the second data signal and the digitized voltage signal at the output terminal of the operation amplifier.

In an aspect, a sensing method of luminous efficiency of the light emitting unit of the above pixel driving module is provided, including: in a third reset phase, controlling the second switch and the third switch to be turned on and the first switch, the fourth switch, the fifth switch and the sixth switch to be turned off; inputting a turn-on signal to the gate of the second transistor via the first gate line terminal; not inputting a turn-on signal to the gate of the third transistor via the second gate line terminal, and inputting a third data signal to the first electrode of the second transistor via the data line terminal, such that a signal through the first signal terminal is written to the sensing line, and the third data signal is written to the storage capacitor; in a third charging phase, not inputting a turn-on signal to the gate of the second transistor and the gate of the third transistor via the first gate line terminal and the second gate line terminal, respectively; and controlling the first switch, the second switch, the third switch, the fourth switch, the fifth switch and the sixth switch to be turned off, such that a signal through the first voltage terminal is written to the fourth node; in a stabilization phase, inputting a turn-on signal to the gate of the second transistor via the first gate line terminal, and not inputting a turn-on signal to the gate of the third transistor via the second gate line terminal; controlling the first switch, the second switch, the third switch, the fourth switch, the fifth switch and the sixth switch to be turned off; and inputting a fourth data signal to the first electrode of the second transistor via the data line terminal, so as to maintain a voltage at the fourth node N4 stable; and in a third sensing phase, inputting a turn-on signal to the gate of the third transistor via the second gate line terminal, and not inputting a turn-on signal to the gate of the second transistor via the first gate line terminal; controlling the first switch, the third switch and the fourth switch to be turned on and the second switch, the fifth switch and the sixth switch to be turned off, such that the voltage at the fourth node N4 is written to the integration capacitor, and the luminous efficiency of the light emitting unit is calculated according to a capacitance of the integration capacitor and the voltage at the fourth node.

BRIEF DESCRIPTION OF DRAWINGS

The accompanying drawings are intended to provide a further understanding of the present disclosure, and constitute a part of the specification to explain the present disclosure together with the following specific implementations, but are not intended to limit the present disclosure.

DETAIL DESCRIPTION OF EMBODIMENTS

Figure 1:
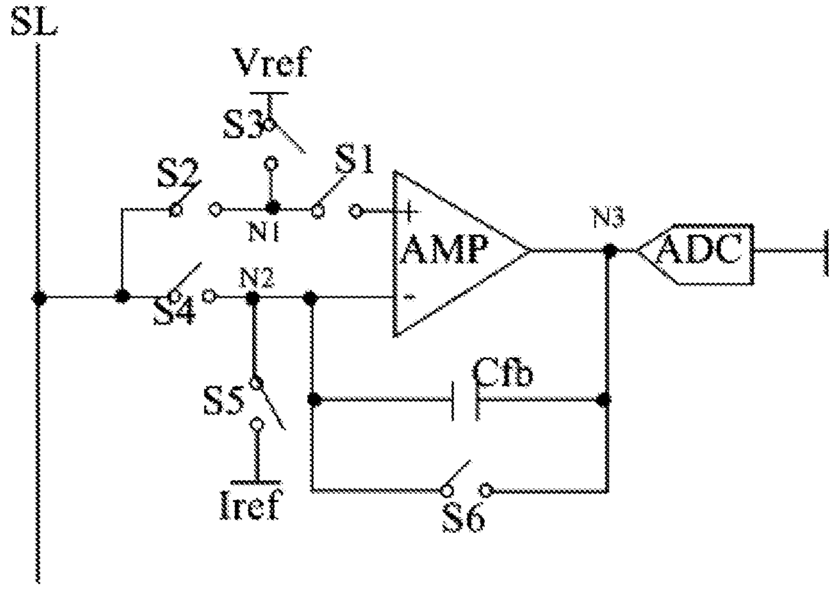
FIG. 1 is a schematic diagram illustrating a structure of a sensing circuit according to an embodiment of the present disclosure.

In order to enable one of ordinary skill in the art to better understand the technical solutions of the present disclosure, the present disclosure is described in detail below with reference to the accompanying drawings and the specific implementations.

The present disclosure will be described in more detail below with reference to the accompanying drawings. Like elements are denoted by like reference numerals throughout the accompanying drawings. For the purposes of clarity, the elements in the accompanying drawings are not drawn to scale. Moreover, certain well-known elements may not be shown in the accompanying drawings.

Numerous specific details of the present disclosure, such as structures, materials, dimensions, processing and techniques of the components, are described in the following description in order to provide a more thorough understanding of the present disclosure. However, as will be understood by those skilled in the art, the present disclosure may be implemented without these specific details.

Due to large resistance and parasitic capacitance of a sensing line, in a super-large-sized organic light emitting diode display apparatus, an external sensing circuit in the related art cannot meet the requirement for sensing a transistor or a light emitting device in a pixel circuit, thereby adversely affecting the display performance of the super-large-sized organic light emitting diode display apparatus.

Accordingly, according to an aspect of the present disclosure, a sensing circuit is provided. As shown in FIG. 1, the sensing circuit includes: an operation amplifier AMP, an integration capacitor Cfb, a first switch S1, a second switch S2, a third switch S3, a fourth switch S4, a fifth switch S5, and a sixth switch S6.

The operation amplifier AMP has an in-phase input terminal connected to a first node N1 via the first switch S1, an anti-phase input terminal connected to a second node N2, and an output terminal connected to a third node N3.

The integration capacitor Cfb has a first electrode connected to the second node N2, and a second electrode connected to the third node N3.

The first node N1 is connected to a sensing line SL via the second switch S2, and is connected to a first signal terminal Vref via the third switch S3.

The second node N2 is connected to the sensing line SL via the fourth switch S4, and is connected to a second signal terminal Iref via the fifth switch S5.

The third node N3 is connected to a signal output terminal of the sensing circuit.

The second node N2 is connected to the third node N3 via the sixth switch S6.

Each of the first switch S1, the second switch S2, the third switch S3, the fourth switch S4, the fifth switch S5, and the sixth switch S6 may be controlled to be turned off or turned on for implementing different connections among the sensing line SL, the operation amplifier AMP, and the integration capacitor Cfb. Further, correction for the operation amplifier AMP and the integration capacitor Cfb may be achieved according to signals provided from the first signal terminal Vref and the second signal terminal Iref, and a combination of turn-on states and turn-off states of the switches (including the first switch S1, the second switch S2, the third switch S3, the fourth switch S4, the fifth switch S5, and the sixth switch S6). The correction for the operation amplifier AMP and the integration capacitor Cfb will be described in detail below.

Optionally, the sensing circuit further includes an analog-to-digital converter ADC having a first terminal connected to the third node N3, and a second terminal connected to the signal output terminal of the sensing circuit, for performing analog-to-digital conversion on a signal at the third node N3.

Optionally, a constant voltage signal is provided through the first signal terminal Vref, and a constant current signal is provided through the second signal terminal Iref.

The sensing circuit of the embodiment may be applied to an organic light emitting diode display apparatus, particularly an organic light emitting diode display apparatus with a larger size, and may sense a transistor or a light emitting device in a pixel circuit of the organic light emitting diode display apparatus, thereby ensuring the display performance of the organic light emitting diode display apparatus. The sensing the transistor or the light emitting device in the pixel circuit of the organic light emitting diode display apparatus will be described in detail below.

According to an aspect of the present disclosure, a correction method for a sensing circuit is further provided for correcting an analog-to-digital converter ADC therein. In a case where the above sensing circuit includes an analog-to-digital converter ADC, the correction method for the analog-to-digital converter ADC includes: supplying a first voltage signal V1 from the first signal terminal Vref to the anti-phase input terminal and the output terminal of the operation amplifier AMP by controlling the second switch S2, the third switch S3, the fourth switch S4 and the sixth switch S6 to be turned on and the first switch S1 and the fifth switch S5 to be turned off; then acquiring a first digitized output voltage signal D1' digitized by the analog-to-digital converter ADC and output through the second (signal output) terminal of the analog-to-digital converter ADC; and finally calculating a correction value $C_{ADC}$ of the analog-to-digital converter ADC according to a first digitized voltage signal D1 obtained after digitizing (performing digital processing on) the first voltage signal V1 and the first digitized output voltage signal D1'. The first digitized voltage signal D1 is obtained by performing idealized analog-to-digital processing on the first voltage signal V1.

Figure 2:
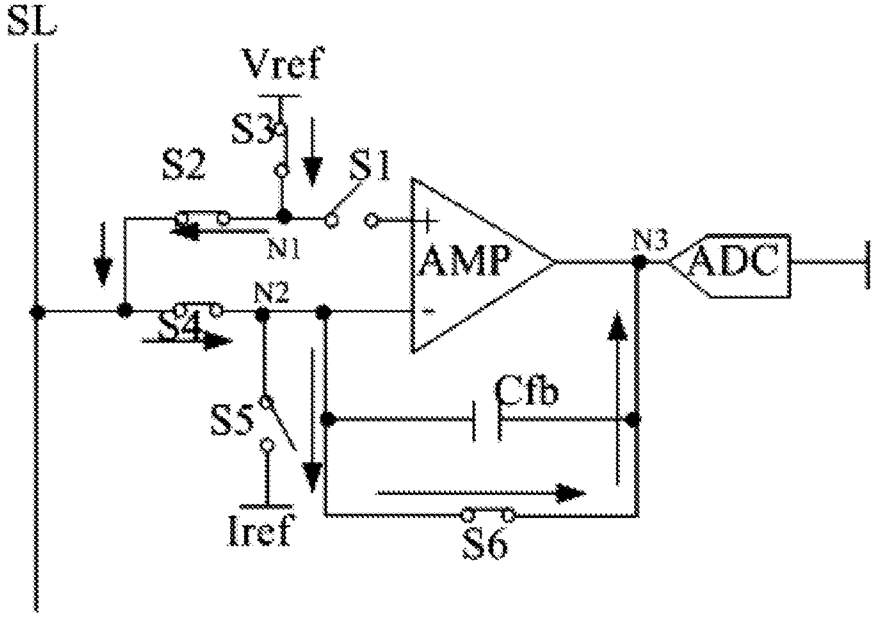
FIG. 2 is a schematic diagram illustrating a correction method for a sensing circuit according to an embodiment of the present disclosure.

Specifically, as shown in FIG. 2, when correcting the analog-to-digital converter ADC, the first switch S1 and the fifth switch S5 are maintained to be turned off, and the second switch S2, the third switch S3, the fourth switch S4 and the sixth switch S6 are maintained to be turned on, so that the first voltage signal V1 from the first signal terminal Vref reaches the third node N3 through the third switch S3, the second switch S2, the fourth switch S4 and the sixth switch S6 in sequence. The third node N3 is provided with the first voltage signal V1, i.e., an input signal of the analog-to-digital converter ADC is the first voltage signal V1. Ideally, the first voltage signal V1 from the first signal terminal Vref is converted into the ideal first digitized output voltage signal D1 after subjecting to the analog-to-digital conversion. However, in practice, due to the characteristics of the devices inside the analog-to-digital converter ADC, the first digitized output voltage signal D1' is obtained after the first voltage signal V1 is processed by the analog-to-digital converter ADC, and is different from the signal D1. Therefore, the correction value $C_{ADC}$ of the analog-to-digital converter ADC may be calculated as $C_{ADC}$=D1−D1'.

A correction method for a sensing circuit is further provided in the present disclosure for correcting the operation amplifier AMP therein. In a case where the above sensing circuit includes an analog-to-digital converter ADC, the correction method for the operation amplifier AMP includes: supplying a second voltage signal V2 from the first signal terminal Vref to the in-phase input terminal of the operation amplifier AMP by controlling the first switch S1, the third switch S3 and the sixth switch S6 to be turned on and the second switch S2, the fourth switch S4 and the fifth switch S5 to be turned off; then acquiring a second digitized output voltage signal D2' at the second terminal of the analog-to-digital converter ADC; and finally calculating a correction value $C_{AMP}$ of the operation amplifier AMP according to a second digitized voltage signal D2 obtained after digitizing the second voltage signal V2, the second digitized output voltage signal D2', and the correction value of the analog-to-digital converter ADC.

Figure 3:
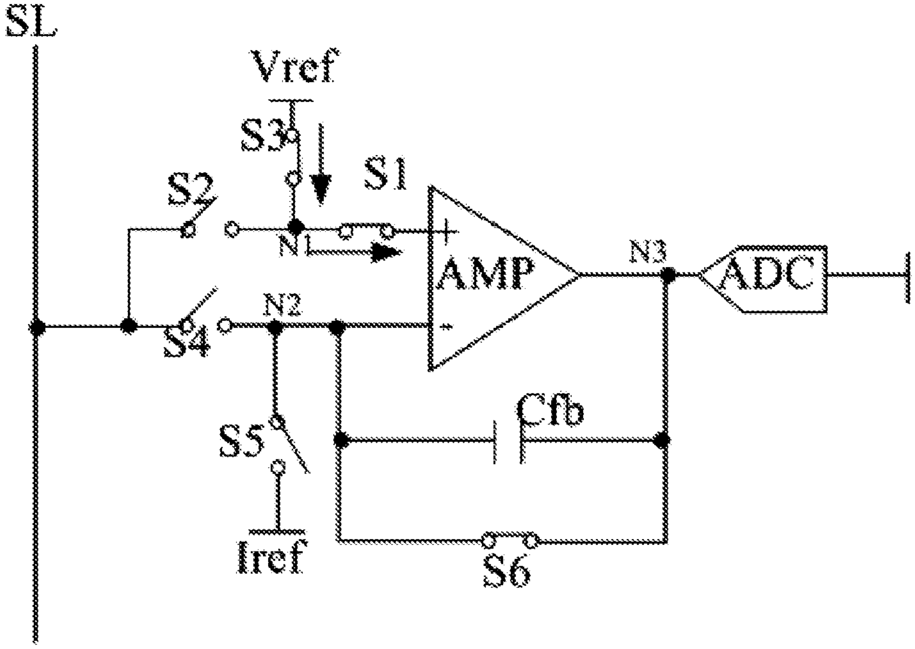
FIG. 3 is a schematic diagram illustrating a correction method for a sensing circuit according to an embodiment of the present disclosure.

Specifically, as shown in FIG. 3, the second switch S2, the fourth switch S4, and the fifth switch S5 are maintained to be turned off and the first switch S1, the third switch S3, and the sixth switch S6 are maintained to be turned on, so that the second voltage signal V2 from the first signal terminal Vref reaches the in-phase input terminal of the operation amplifier AMP through the third switch S3 and the first switch S1 in sequence. Since the sixth switch S6 is turned on, the operation amplifier AMP outputs the second output voltage to the first terminal (input terminal) of the analog-to-digital converter ADC in a voltage following manner. Ideally, the second voltage signal V2 of the first signal terminal Vref corresponds to the ideal second digitized output voltage signal D2, and the operation amplifier AMP outputs the second output voltage in a voltage following manner. The second digitized output voltage signal D2' is obtained after the second output voltage signal is processed by the analog-to-digital converter ADC. Therefore, the correction value of the operation amplifier AMP may be calculated as $C_{AMP}$=D2+$C_{ADC}$−D2'.

A correction method for a sensing circuit is further provided in the present disclosure for computing the correction value of the integration capacitor Cfb therein. In a case where the above sensing circuit includes an analog-to-digital converter ADC, the method for calculating the correction value of the integration capacitor Cfb includes: supplying a first current signal from the second signal terminal Iref to the integration capacitor Cfb and the anti-phase input terminal of the operation amplifier AMP and supplying a third voltage signal V3 from the first signal terminal Vref to the in-phase input terminal of the operation amplifier AMP by controlling the first switch S1, the third switch S3 and the fifth switch S5 to be turned on and the second switch S2, the fourth switch S4 and the sixth switch S6 to be turned off; then acquiring a third digitized output voltage signal d3' at the second terminal of the analog-to-digital converter ADC and a third digitized input voltage signal d3 (i.e., a digitized output voltage signal corresponding to the third output voltage v3 output by the operation amplifier AMP) at the first terminal of the analog-to-digital converter ADC; and finally calculating the correction value of the integration capacitor Cfb according to a third digitized voltage signal D3 obtained after digitizing the third voltage signal V3, the third digitized output voltage signal d3', the third digitized input voltage signal d3, and a capacitance of the integration capacitor Cfb. The third digitized input voltage signal d3 is obtained by performing an idealized analog-to-digital conversion on the voltage at the first terminal of the analog-to-digital converter.

Figure 4:
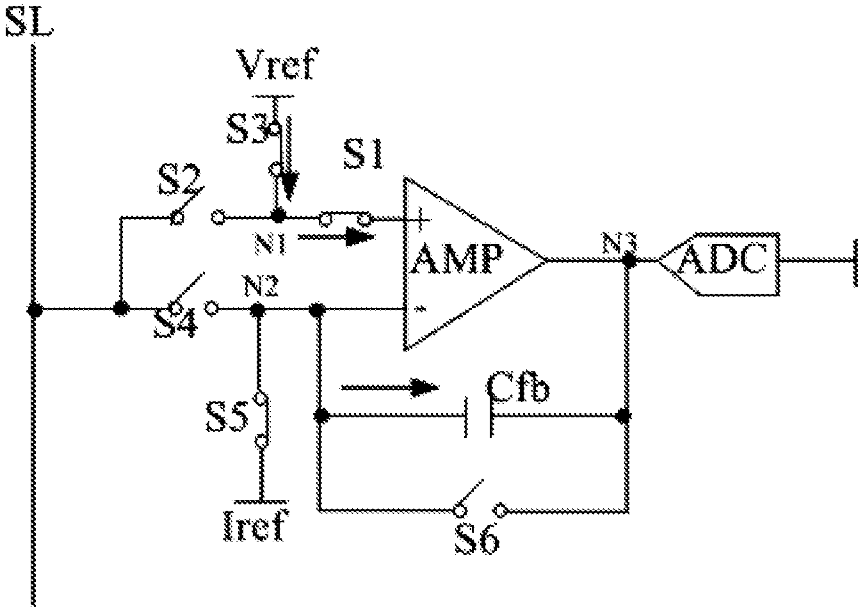
FIG. 4 is a schematic diagram illustrating a correction method for a sensing circuit according to an embodiment of the present disclosure.

Specifically, as shown in FIG. 4, the second switch S2, the fourth switch S4, and the sixth switch S6 are maintained to be turned off and the first switch S1, the third switch S3, and the fifth switch S5 are maintained to be turned on, so that the first current signal I1 is written to the integration capacitor Cfb via the second signal terminal Iref. The integration capacitor Cfb has a capacitance value of Cf. Ideally, a constant current may flow through the integration capacitor Cfb for a set duration T, and there is a voltage difference Vc across the integration capacitor Cfb. The third voltage signal V3 is supplied from the first signal terminal Vref to the in-phase input terminal of the operation amplifier AMP through the third switch S3 and the first switch S1 in sequence, and the first current signal I1 is supplied from the second signal terminal Iref to the integration capacitor Cfb through the fifth switch S5. The output terminal of the operation amplifier AMP outputs the third output voltage signal v3 to the analog-to-digital converter ADC, and the analog-to-digital converter ADC outputs the digitized third output voltage signal d3'. Ideally, the third output voltage signal v3 corresponds to the ideal third output voltage signal d3. Ideally, the third voltage signal V3 from the first signal terminal Vref corresponds to the ideal third output voltage signal D3, and the third digitized output voltage D3' is output after the third voltage signal V3 is processed by the analog-to-digital converter ADC. Therefore, the correction value of the integration capacitor Cfb may be calculated as $C_{Cfb}$=Cf*(D3−d3)/(D3−d3').

As can be seen from the above, in a current sensing mode, if a current I2 flows through the sensing line SL to the integration capacitor Cfb of the sensing circuit for a set duration T', the analog-to-digital converter ADC has a final output value of $V_{ADC}=(I2\times T')/C_{Cfb}+C_{AMP}+C_{ADC}$ according to the correction value of the analog-to-digital converter ADC, the correction value of the operation amplifier AMP, and the correction value of the integration capacitor Cfb.

A correction method for a sensing circuit is further provided in the present disclosure for correcting the operation amplifier AMP therein. In a case where the above sensing circuit does not include an analog-to-digital converter ADC, the method for correcting the operation amplifier AMP includes: supplying a second voltage signal V2 from the first signal terminal Vref to the in-phase input terminal of the operation amplifier AMP by controlling the first switch S1, the third switch S3 and the sixth switch S6 to be turned on and the second switch S2, the fourth switch S4 and the fifth switch S5 to be turned off; then acquiring a second output voltage signal at the output terminal of the operation amplifier AMP; and finally calculating a correction value $C_{AMP}$ of the operation amplifier AMP according to the second voltage signal and the second output voltage signal. The digital processing on the voltage signal by the analog-to-digital converter ADC is not needed in the method.

A correction method for a sensing circuit is further provided in the present disclosure for calculating a correction value of the integration capacitor Cfb therein. In a case where the above sensing circuit does not include an analog-to-digital converter ADC, the method for calculating the correction value of the integration capacitor Cfb includes: supplying a first current signal from the second signal terminal Iref to the integration capacitor Cfb, and supplying a third voltage signal V3 from the first signal terminal Vref to the in-phase input terminal of the operation amplifier AMP by controlling the first switch S1, the third switch S3, and the fifth switch S5 to be turned on and the second switch S2, the fourth switch S4, and the sixth switch S6 to be turned off; then acquiring a third output voltage signal at the output terminal of the operation amplifier AMP; and finally calculating a correction value of the integration capacitor Cfb according to the third voltage signal V3, the third output voltage signal, and the capacitance of the integration capacitor Cfb. The digital processing on the voltage signal by the analog-to-digital converter ADC is not needed in the method.

As shown in FIGS. 6 to 10, a pixel driving module including the above sensing circuit and a pixel circuit is further provided in the present disclosure.

The pixel circuit includes a driving unit, a light emitting unit 1, a data writing unit, a storage unit, and a sensing unit. The driving unit has a control terminal connected at a fifth node N5 to a second terminal of the data writing unit and to a first terminal of the storage unit, a first terminal connected to a first voltage terminal ELVDD, and a second terminal connected at a fourth node N4 to a first terminal of the light emitting unit, a first terminal of the sensing unit and a second terminal of the storage unit, so as to drive the light emitting unit 1 to emit light. The data writing unit has a control terminal connected to a first gate line terminal GL1, and a first terminal connected to a data line terminal DL, so as to write a data signal from the data line terminal DL to the control terminal of the driving unit by the adjustment of the storage unit. The sensing unit has a control terminal connected to a second gate line terminal GL2, and a second terminal connected to the sensing line SL, so as to input a signal at the fourth node N4 to the sensing line SL, thereby sensing the driving unit by the sensing circuit. The light emitting unit has a second terminal connected to a second voltage terminal ELVSS.

Optionally, the driving unit includes: a first transistor T1 having a gate used as the control terminal of the driving unit and connected to the fifth node N5, a first electrode used as the first terminal of the driving unit and connected to the first voltage terminal ELVDD, and a second electrode used as the second terminal of the driving unit and connected to the fourth node N4.

The data writing unit includes a second transistor T2 having a gate used as the control terminal of the data writing unit and connected to the first gate line terminal GL1, a first electrode used as the first terminal of the data writing unit and connected to the data line terminal DL, and a second electrode used as the second terminal of the data writing unit and connected to the fifth node N5.

The storage unit includes a storage capacitor Cst having a first electrode used as the first terminal of the storage unit and connected to the fifth node N5 and a second electrode used as the second terminal of the storage unit and connected to the fourth node N4.

The light emitting unit 1 has a first electrode used as the first terminal of the light emitting unit and connected to the fourth node N4, and a second electrode used as the second terminal of the light emitting unit and connected to the second voltage terminal ELVSS.

The sensing unit includes a third transistor T3 having a gate used as the control terminal of the sensing unit and connected to the second gate line terminal GL2, a first electrode used as the first terminal of the sensing unit and connected to the fourth node N4, and a second electrode used as the second terminal of the sensing unit and connected to the sensing line SL.

Optionally, each of the first transistor T1, the second transistor T2, and the third transistor T3 is an N-type transistor; alternatively, each of the first transistor T1, the second transistor T2, and the third transistor T3 is a P-type transistor. In the present disclosure, each of the above transistors is an N-type transistor as an example, and thus a turn-on signal is a high level signal and a turn-off signal is a low level signal.

In the present embodiment, the first voltage terminal ELVDD is configured to provide an operating voltage, and the second voltage terminal ELVSS is configured to provide a reference voltage.

In the present disclosure, optionally, the display apparatus may include a plurality of sensing lines SL. One of the plurality of sensing lines SL may be connected to at least one column of sub-pixels, and at least one of the plurality of sensing lines SL may be connected to one sensing circuit, such that one sensing circuit may be connected to at least one column of sub-pixels, but the present disclosure is not limited thereto.

It should be noted that, the light emitting unit 1 in the present embodiment may be a current-driven light emitting device including an LED (Light Emitting Diode) or an OLED (Organic Light Emitting Diode), and the present embodiment is described by taking the OLED as an example. Each of the first switch S1, the second switch S2, the third switch S3, the fourth switch S4, the fifth switch S5, and the sixth switch S6 may be any controllable switch device.

The pixel driving module of the embodiments may be applied to an organic light emitting diode display apparatus, particularly an organic light emitting diode display apparatus with a larger size, and may sense a transistor or a light emitting device in a pixel circuit of the organic light emitting diode display apparatus, thereby ensuring the display performance of the organic light emitting diode display apparatus.

It should be noted that, the organic light emitting diode display apparatus includes a plurality of pixel circuits arranged in an array for displaying. Sensing circuits may be provided in a one-to-one correspondence with the pixel circuits, or several rows or some of the pixel circuits may correspond to one sensing circuit as needed.

Figure 10:
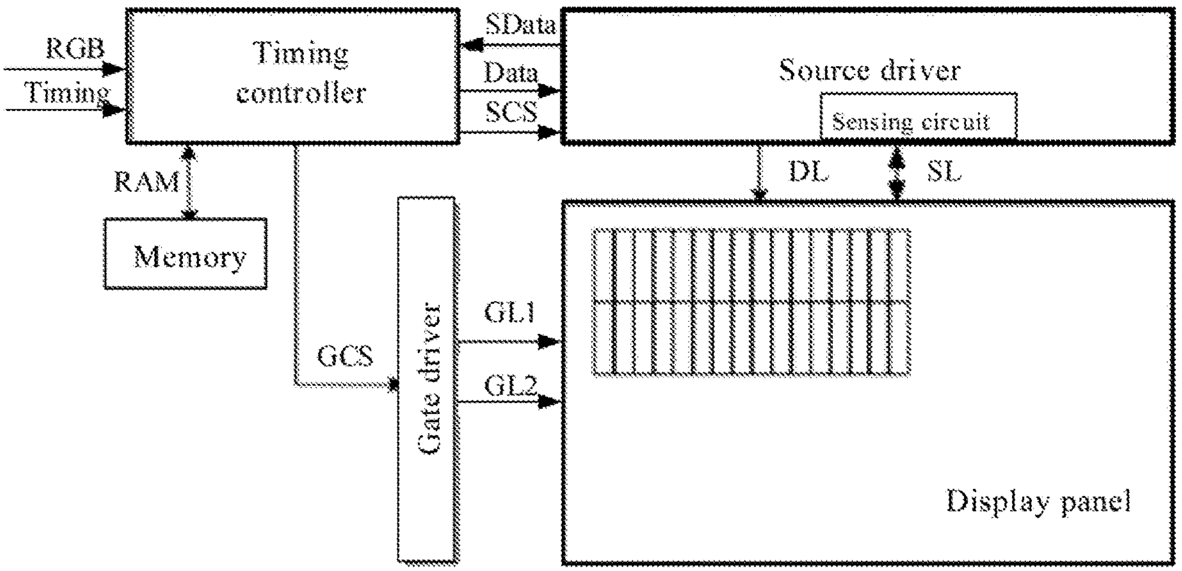
FIG. 10 is a schematic diagram illustrating a structure of a display apparatus according to an embodiment of the present disclosure.

According to an aspect of the present disclosure, a display apparatus is provided. As shown in FIG. 10, the display apparatus mainly includes a display panel, a timing controller, a source driver, a gate driver, a memory, and the like. The display panel is connected to the source driver and the gate driver. The timing controller is connected to the source driver, the gate driver, and the memory. The sensing circuits may be located in the source driver, and the pixel circuits may be located in the display panel.

The timing controller reads data stored in the memory (RAM), and receives externally input data (RGB), a timing control signal (Timing), and sensing data (SData) output from the source driver. After the processing, such as calculation, conversion, compensation and the like, the timing controller generates and outputs data (Data) subjected to the compensation processing and a source control signal (SCS) to the source driver, and generates and outputs a gate control signal (GCS) to the gate driver.

The memory may store pixel compensation values for one or more pixel circuits, such as a threshold voltage Vth and a mobility K of the first transistor T1 for controlling the light emitting unit 1 of the pixel circuit to emit light, and luminous efficiency of the light emitting unit, and the like.

The source driver receives the data (Data) subjected to the compensation processing and the source control signal (SCS) output from the timing controller, generates a data signal (Vdata) which is output to the display panel via the data line (DL). Meanwhile, the sensing circuit is under the control of the source control signal (SCS) to realize the correction for the analog-to-digital converter ADC, the operation amplifier AMP, and the integration capacitor Cfb of the sensing circuit, and to realize the resetting and charging for the sensing line SL, and the like. Characteristic values of a certain row or some of the pixel circuits are sensed via the sensing line SL, and the sensing data (SData) generated by the analog-to-digital converter ADC is output to the timing controller.

The gate driver receives the gate control signal (GCS), generates and outputs a scan signal corresponding to at least one scan line (GL1, GL2, GL3, etc.) to the display panel.

Specifically, the organic light emitting diode display apparatus may be any product or component with a display function, such as an electronic paper, a mobile phone, a tablet computer, a television, a display, a notebook computer, a digital photo frame, a navigator and the like.

Figure 7A:
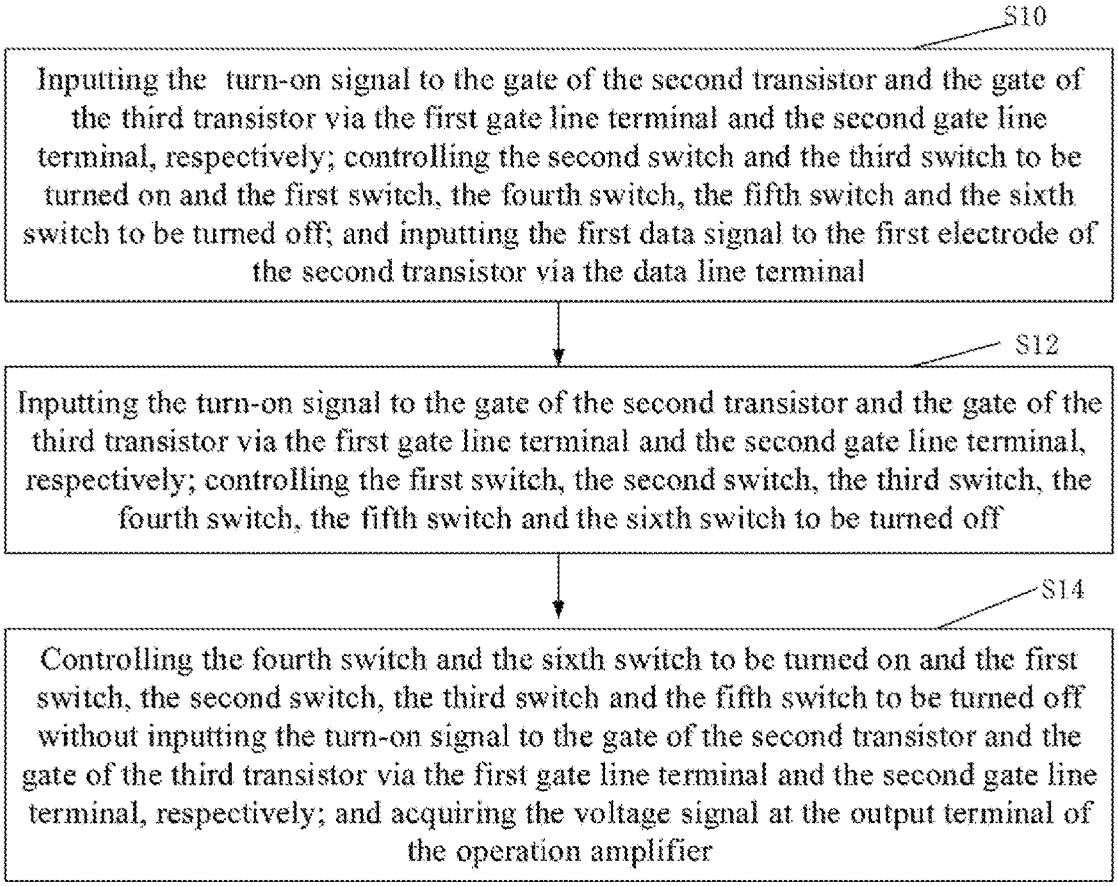
FIG. 7*a* is a flowchart of sensing a threshold voltage of a pixel driving module according to an embodiment of the present disclosure.
Figure 7B:
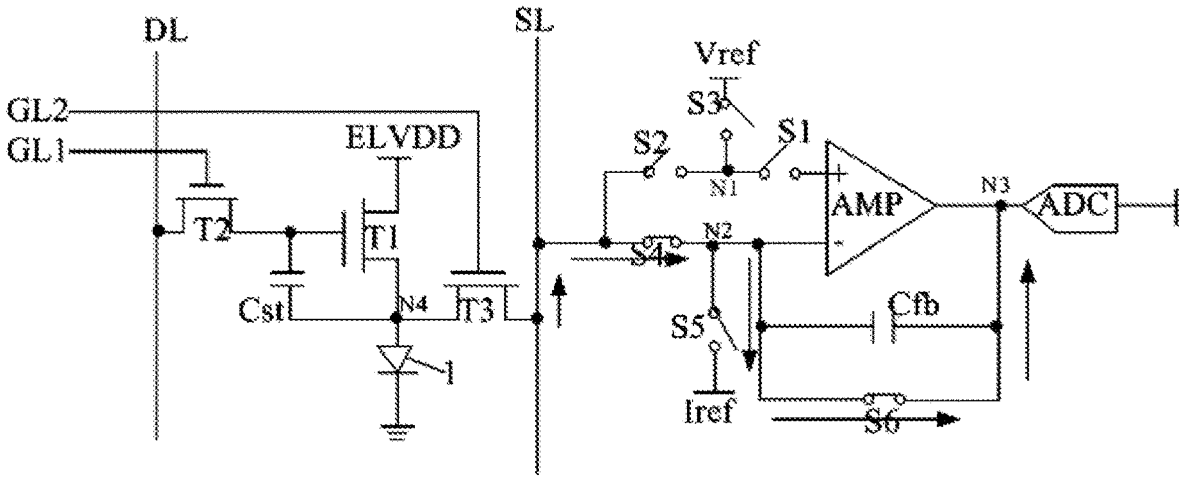
FIG. 7*b* is a schematic diagram of sensing a threshold voltage of a pixel driving module according to an embodiment of the present disclosure.
Figure 7C:
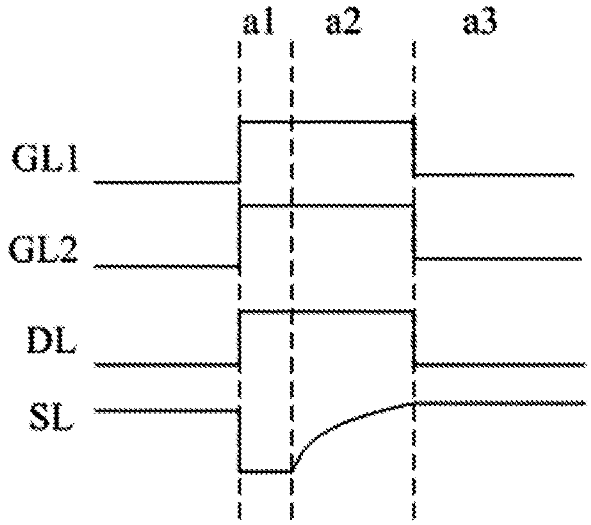
FIG. 7*c* is a timing diagram of sensing a threshold voltage of the pixel driving module shown in FIG. 7*b;*

As shown in FIGS. 7*a*, 7*b* and 7*c*, a sensing method of a threshold voltage of the above pixel driving module is further provided in the present disclosure. As shown in FIG. 7*a*, the method includes the steps S10 to S14.

In step S10 (i.e., a first reset phase a1), a turn-on signal is input to the gate of the second transistor T1 and the gate of the third transistor T3 via the first gate line terminal GL1 and the second gate line terminal GL2, respectively; the second switch S2 and the third switch S3 are controlled to be turned on, and the first switch S1, the fourth switch S4, the fifth switch S5 and the sixth switch S6 are controlled to be turned off; and the first data signal Vdata is input to the first electrode of the second transistor T2 via the data line terminal DL, so that the signal at the first signal terminal Vref is written into the sensing line SL to reset the sensing line SL, and the first data signal Vdata is written into the storage capacitor Cst.

Figure 5:
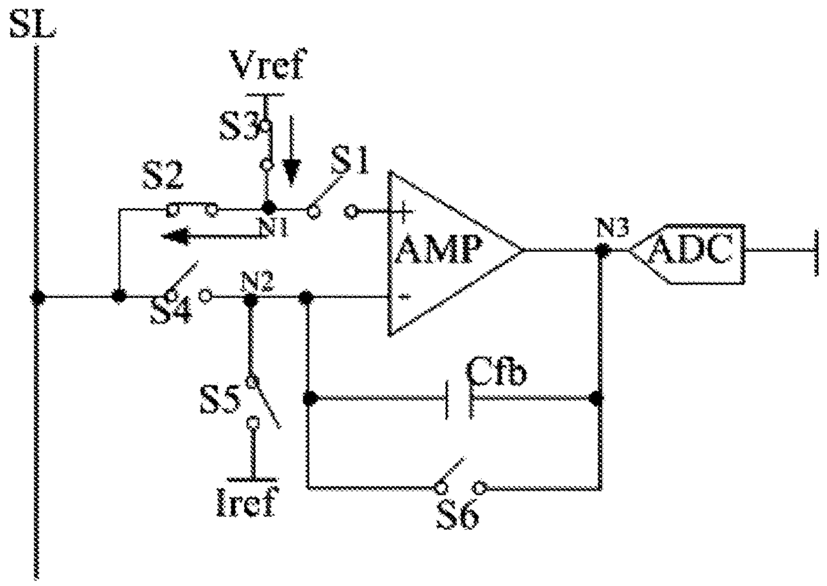
FIG. 5 is a schematic diagram illustrating a sensing circuit in a reset phase according to an embodiment of the present disclosure.

Referring to FIG. 5, a turn-off signal is input to the first switch S1, the fourth switch S4, the fifth switch S5, and the sixth switch S6, so that the first switch S1, the fourth switch S4, the fifth switch S5, and the sixth switch S6 are turned off; a turn-on signal is input to the second switch S2 and the third switch S3, so that the second switch S2 and the third switch S3 are turned on. Meanwhile, a turn-on signal is input to the first gate line terminal GL1 and the second gate line terminal GL2, so that the second transistor T2 and the third transistor T3 are turned on. In this case, the first data signal Vdata is written into the storage capacitor Cst through the data line terminal DL, while a constant voltage signal is written into the sensing line SL through the first signal terminal Vref. It should be noted that, as shown in FIG. 5, in this phase, the sensing circuit resets the sensing line SL, that is, the sensing circuit has the function of resetting the sensing line SL.

In step S12 (i.e., a first charging phase a2), a turn-on signal is input to the gate of the second transistor T2 and the gate of the third transistor T3 via the first gate line terminal GL1 and the second gate line terminal GL2, respectively; the first switch S1, the second switch S2, the third switch S3, the fourth switch S4, the fifth switch S5 and the sixth switch S6 are controlled to be turned off, so that the signal provided through the first voltage terminal ELVDD is written into the sensing line SL.

Figure 6:
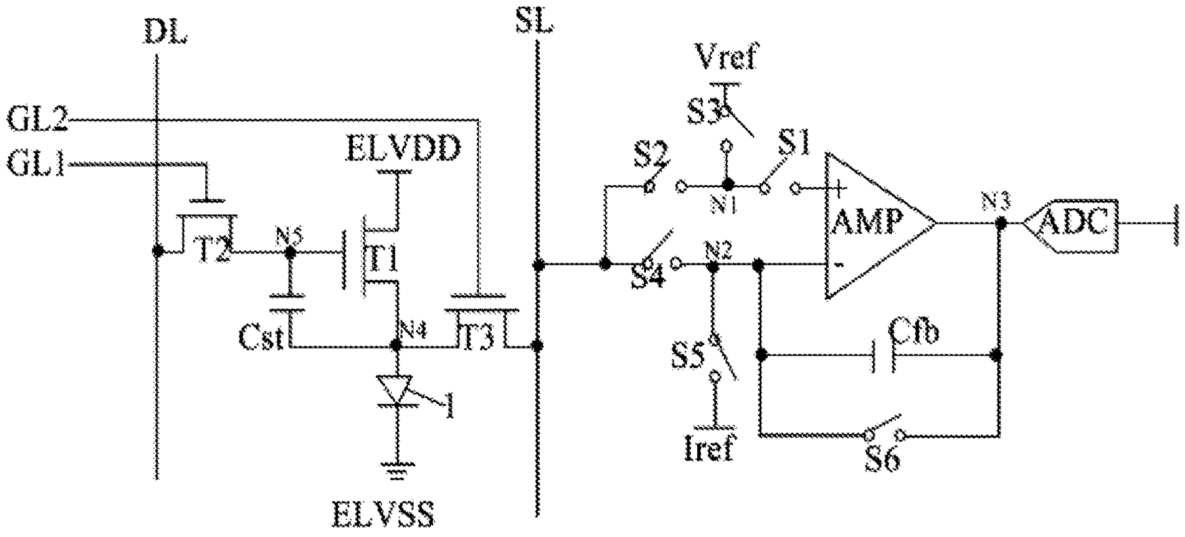
FIG. 6 is a schematic diagram illustrating a structure of a pixel driving module according to an embodiment of the present disclosure.

Referring to FIG. 6, a turn-off signal is input to the first switch S1, the second switch S2, the third switch S3, the fourth switch S4, the fifth switch S5 and the sixth switch S6, such that the first switch S1, the second switch S2, the third switch S3, the fourth switch S4, the fifth switch S5 and the sixth switch S6 are turned off, which is equivalent to floating of the sensing line SL for the sensing circuit, that is, the sensing circuit has a floating function for the sensing line SL. A turn-on signal is input to the first gate line terminal GL1 and the second gate line terminal GL2, so that the second transistor T2 and the third transistor T3 are turned on. Meanwhile, due to the storage function of the storage capacitor Cst in the previous phase, the first transistor T1 is turned on, and a current, caused by the signal at the first voltage terminal ELVDD, passes through the first transistor T1 and the third transistor T3 to the sensing line SL in sequence, and a voltage on the sensing line SL is continuously increased.

In step S14 (i.e., a first sensing phase a3), the fourth switch S4 and the sixth switch S6 are controlled to be turned on, and the first switch S1, the second switch S2, the third switch S3 and the fifth switch S5 are controlled to be turned off; a turn-on signal is not input to the gate of the second transistor T2 and the gate of the third transistor T3 via the first gate line terminal and the second gate line terminal, respectively; and the signal through the sensing line SL passes through the operation amplifier AMP and is output by the analog-to-digital converter ADC. The voltage signal at the output terminal of the operation amplifier AMP is acquired to calculate the threshold voltage of the first transistor T1 according to the first data signal and the voltage signal at the output terminal of the operation amplifier AMP.

As shown in FIGS. 7*b* and 7*c*, a turn-off signal is input to the first gate line terminal GL1, the second gate line terminal GL2, the first switch S1, the second switch S2, the third switch S3, and the fifth switch S5, so that the second transistor T2, the third transistor T3, the first switch S1, the second switch S2, the third switch S3, and the fifth switch S5 are turned off. A turn-on signal is input to the fourth switch S4 and the sixth switch S6, so that the fourth switch S4 and the sixth switch S6 are turned on. In this case, the voltage of the sensing line SL is not changed, and reaches the third node N3 via the fourth switch S4 and the sixth switch S6, and a signal at the third node N3 is Vdata-Vth. A difference between the first data signal Vdata at the data line terminal DL in the reset phase and the output signal Vdata-Vth is the threshold voltage Vth of the first transistor T1.

Figure 8A:
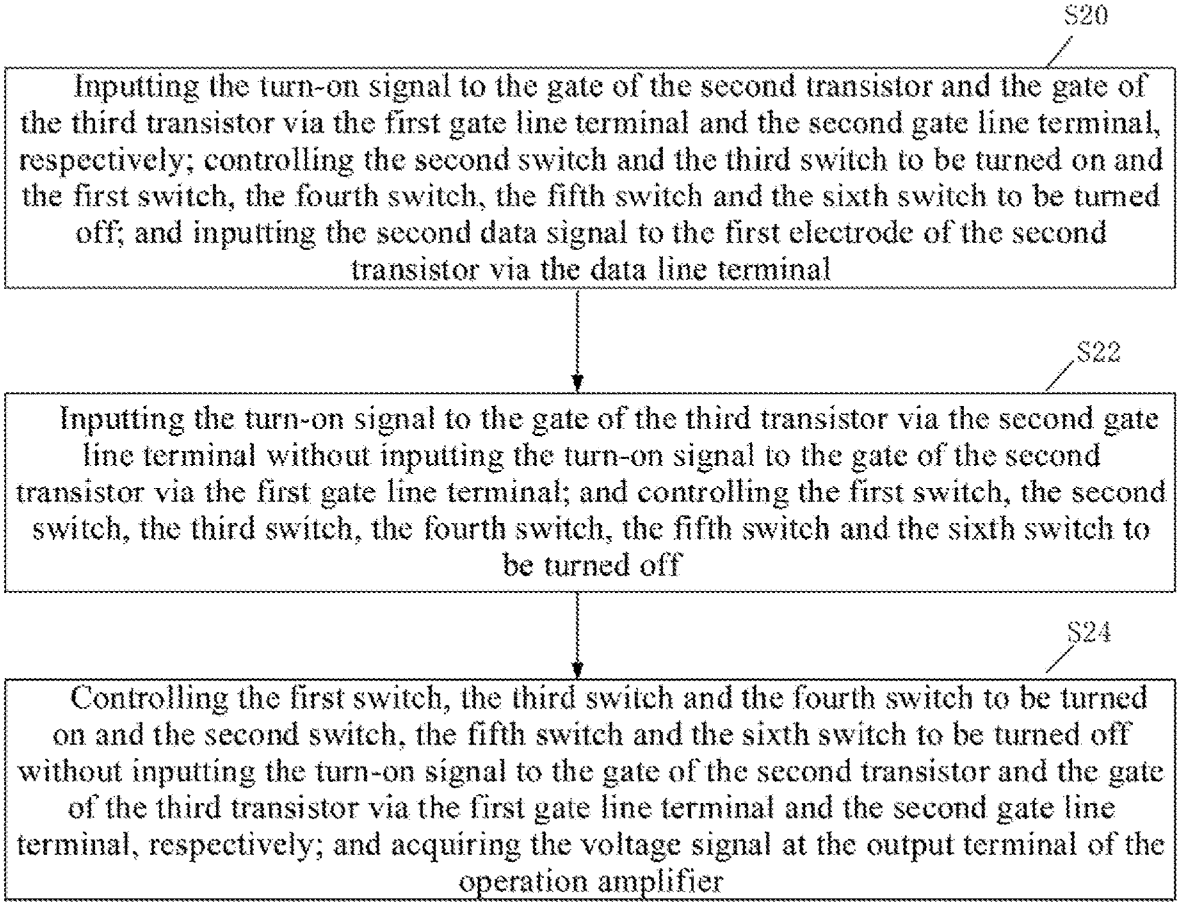
FIG. 8*a* is a flowchart of sensing mobility of a pixel driving module according to an embodiment of the present disclosure.
Figure 8B:
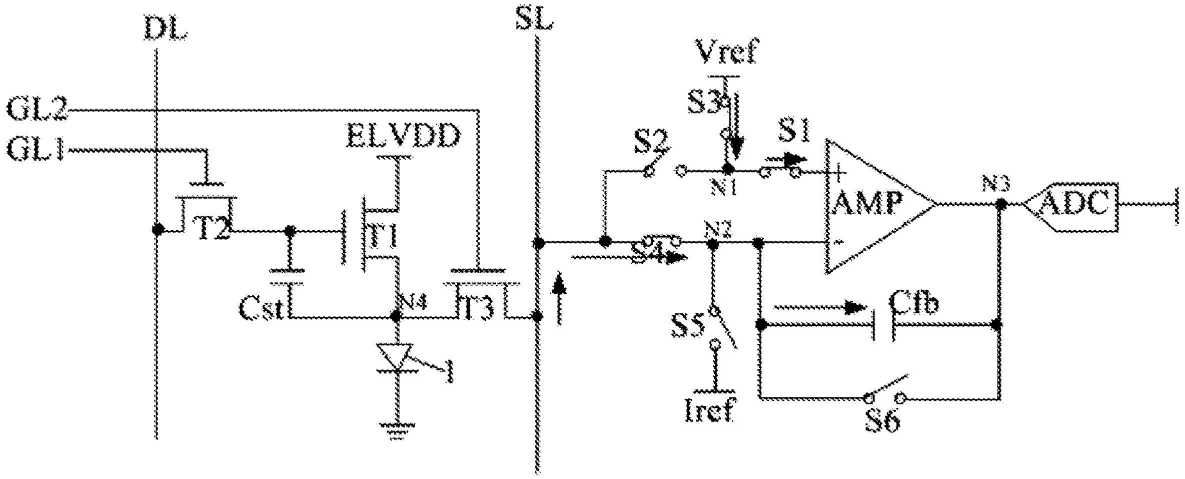
FIG. 8*b* is a schematic diagram of sensing mobility of a pixel driving module according to an embodiment of the present disclosure.
Figure 8C:
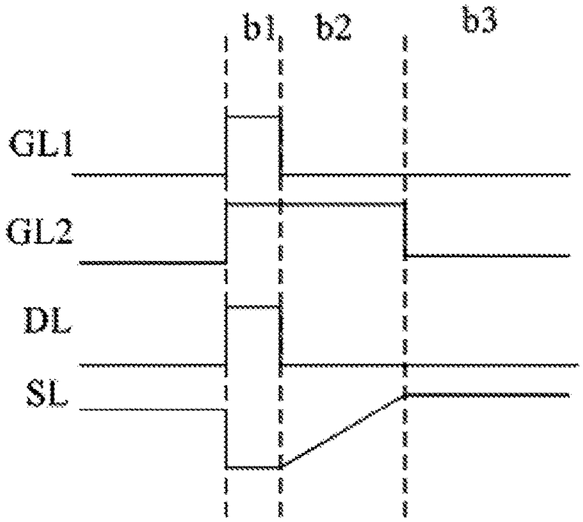
FIG. 8*c* is a timing diagram of sensing mobility of the pixel driving module shown in FIG. 8*b;*

As shown in FIGS. 8*a*, 8*b* and 8*c*, a sensing method of the mobility of the pixel driving module is further provided in the present disclosure. As shown in FIG. 8*a*, the method includes the steps S20 to S24.

In step S20 (i.e., a second reset phase b1), a turn-on signal is written to the gate of the second transistor T2 and the gate of the third transistor T3 via the first gate line terminal GL1 and the second gate line terminal GL2, respectively; the second switch S2 and the third switch S3 are controlled to be turned on, and the first switch S1, the fourth switch S4, the fifth switch S5 and the sixth switch S6 are controlled to be turned off; and a second data signal Vdata+Vth is input to the gate of the third transistor T3 via the data line terminal DL, so that the signal at the first signal terminal Vref is written to the sensing line SL and the second data signal is written to the storage capacitor Cst.

As shown in FIGS. 8*b* and 8*c*, a turn-off signal is input to the first switch S1, the fourth switch S4, the fifth switch S5 and the sixth switch S6, so that the first switch S1, the fourth switch S4, the fifth switch S5 and the sixth switch S6 are turned off. A turn-on signal is input to the first gate line terminal GL1, the second gate line terminal GL2, the second switch S2, and the third switch S3, so that the second transistor T2, the third transistor T3, the second switch S2, and the third switch S3 are turned on. The second data signal Vdata+Vth from the data line terminal DL is written into the storage capacitor Cst, while the constant voltage signal from the first signal terminal Vref is written into the sensing line SL.

It should be noted that, as shown in FIG. 5, in this phase, the sensing circuit resets the sensing line SL, that is, the sensing circuit has the function of resetting the sensing line SL.

In step S22 (i.e., a second charging phase b2), a turn-on signal is input to the gate of the third transistor T3 via the second gate line terminal GL2; a turn-on signal is not written to the gate of the second transistor T2 via the first gate line terminal GL1; and the first switch S1, the second switch S2, the third switch S3, the fourth switch S4, the fifth switch S5 and the sixth switch S6 are controlled to be turned off, so that the signal at the first voltage terminal ELVDD is written to the sensing line SL.

That is, a turn-off signal is input to the first gate line terminal GL1, the first switch S1, the second switch S2, the third switch S3, the fourth switch S4, the fifth switch S5, and the sixth switch S6, so that the second transistor T2, the first switch S1, the second switch S2, the third switch S3, the fourth switch S4, the fifth switch S5, and the sixth switch S6 are turned off, which is equivalent to floating of the sensing line SL for the sensing circuit, that is, the sensing circuit has a floating function on the sensing line SL. At the same time, a turn-on signal is input to the second gate line terminal GL2, so that the third transistor T3 is turned on. In this case, the first transistor T1 is turned on due to the storage function of the storage capacitor Cst in the previous phase, a current, caused by the signal at the first voltage terminal ELVDD, flows through the first transistor T1 and the third transistor T3 in sequence, and is written into the sensing line SL. The voltage on the sensing line SL is continuously increased.

In step S24 (i.e., a second sensing phase b3), the first switch S1, the third switch S3 and the fourth switch S4 are controlled to be turned on, and the second switch S2, the fifth switch S5 and the sixth switch S6 are controlled to be turned off; a turn-on signal is not input to the gate of the second transistor T2 and the gate of the third transistor T3 via the first gate line terminal GL1 and the second gate line terminal GL2, respectively; and the signal through the sensing line SL passes through the operation amplifier AMP and is output by the analog-to-digital converter ADC. The voltage signal at the output terminal of the operation amplifier AMP is acquired to calculate the mobility of the first transistor T1 according to the second data signal and the voltage signal at the output terminal of the operation amplifier AMP.

As shown in FIG. 8*c*, a turn-off signal is input to the first gate line terminal GL1, the second gate line terminal GL2, the second switch S2, the fifth switch S5 and the sixth switch S6, so that the second transistor T2, the third transistor T3, the second switch S2, the fifth switch S5 and the sixth switch S6 are turned off. A turn-on signal is input to the first switch S1, the third switch S3 and the fourth switch S4, so that the first switch S1, the third switch S3 and the fourth switch S4 are turned on. In this case, the voltage through the sensing line SL is unchanged, and sequentially passes through the fourth switch S4 and the storage capacitor Cfb to the analog-to-digital converter ADC to output a corresponding voltage, which may reflect a magnitude of a current passing through the first transistor T1. The voltage signal at the output terminal of the operation amplifier AMP is acquired to calculate the mobility K of the first transistor T1 according to the second data signal and the voltage signal at the output terminal of the operation amplifier AMP.

Figure 9A:
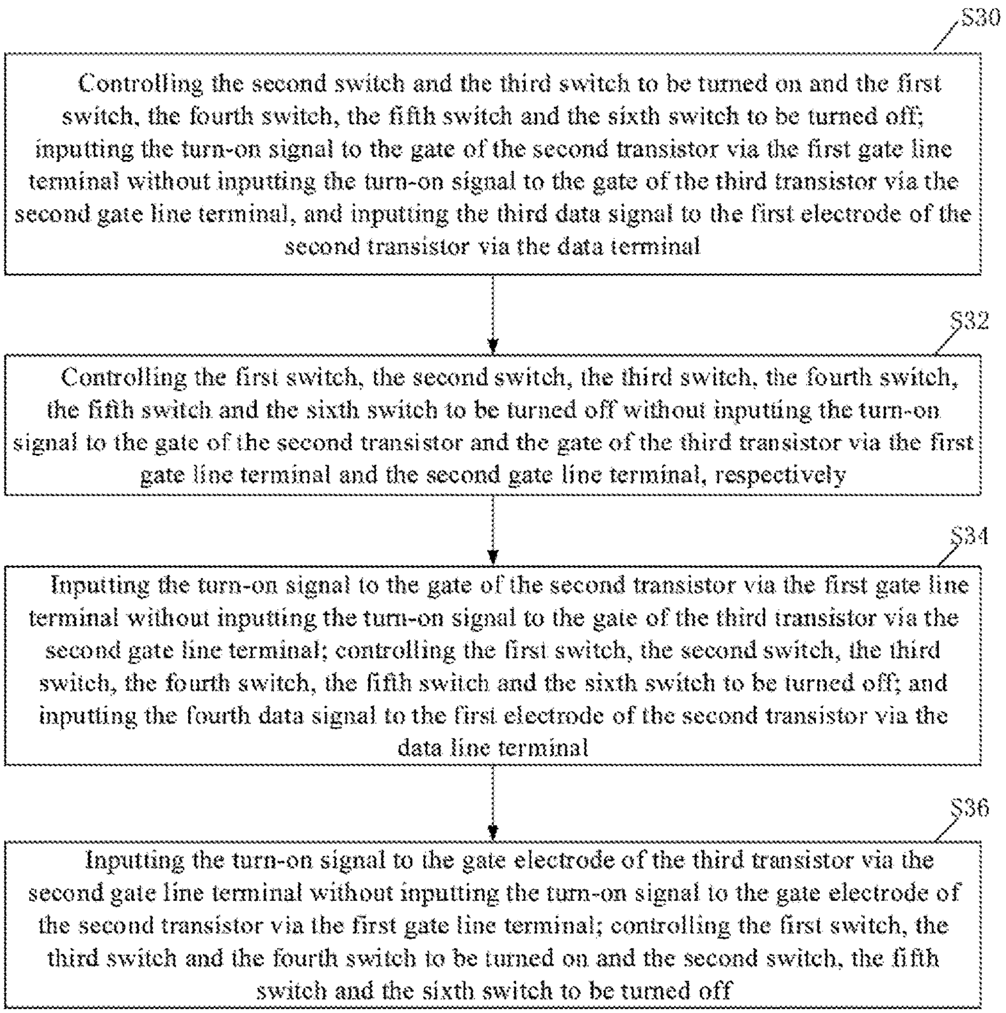
FIG. 9*a* is a flowchart of sensing light emitting efficiency of a pixel driving module according to an embodiment of the present disclosure.
Figure 9B:
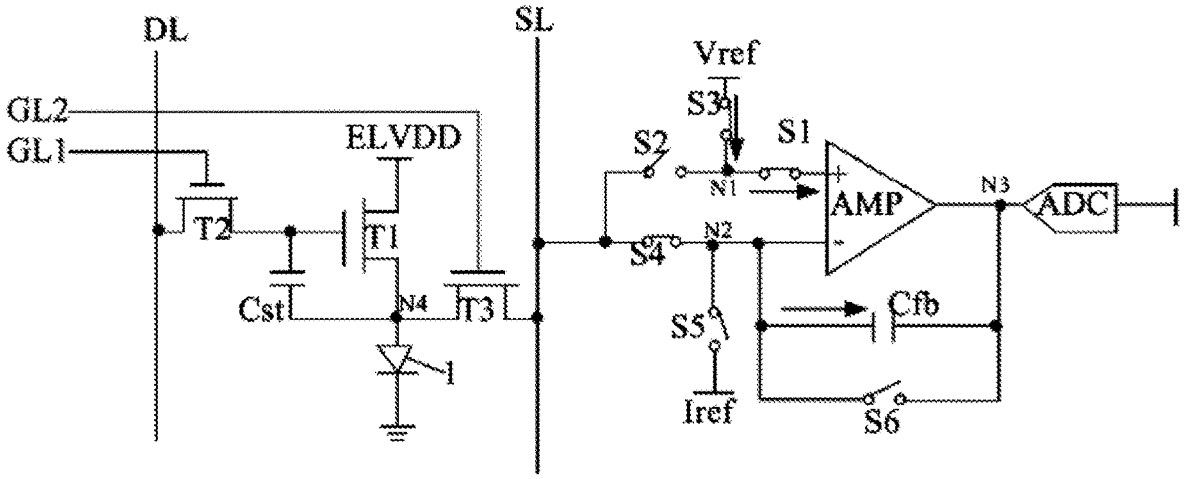
FIG. 9*b* is a schematic diagram of sensing light emitting efficiency of a pixel driving module according to an embodiment of the present disclosure.
Figure 9C:
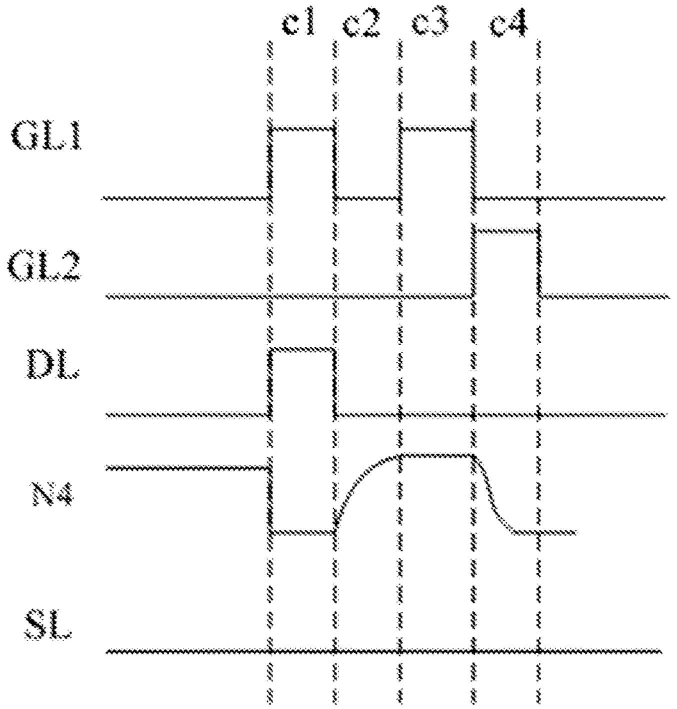
FIG. 9*c* is a timing diagram of sensing light emitting efficiency of the pixel driving module shown in FIG. 9*b*.

As shown in FIGS. 9*a*, 9*b* and 9*c*, a sensing method of the luminous efficiency of the light emitting unit 1 of the pixel driving module is further provided in the present disclosure. As shown in FIG. 9*a*, the method includes the steps S30 to S36.

In step S30 (i.e., a third reset phase c1), the second switch S2 and the third switch S3 are controlled to be turned on, and the first switch S1, the fourth switch S4, the fifth switch S5 and the sixth switch S6 are controlled to be turned off; a turn-on signal is input to the gate of the second transistor T2 via the first gate line terminal GL1; a turn-on signal is not written to the gate of the third transistor T3 via the second gate line terminal GL2, and a third data signal Vdata+Vth is input to the first electrode of the second transistor T2 via the data line terminal DL, so that the signal at the first signal terminal Vref is written to the sensing line SL, and the third data signal Vdata+Vth is written to the storage capacitor Cst.

That is, a turn-off signal is input to the second gate line terminal GL2, the first switch S1, the fourth switch S4, the fifth switch S5 and the sixth switch S6, so that the third transistor T3, the first switch S1, the fourth switch S4, the fifth switch S5 and the sixth switch S6 are turned off. A turn-on signal is input to the first gate line terminal GL1, the second switch S2, and the third switch S3, so that the second transistor T2, the second switch S2, and the third switch S3 are turned on. The third data signal Vdata+Vth from the data line terminal DL is written into the storage capacitor Cst, while the constant voltage signal from the first signal terminal Vref is written into the sensing line SL.

It should be noted that, as shown in FIG. 5, in this phase, the sensing circuit resets the sensing line SL, that is, the sensing circuit has the function of resetting the sensing line SL.

In step S32 (i.e., a third charging phase c2), a turn-on signal is not input to the gate of the second transistor T2 and the gate of the third transistor T3 via the first gate line terminal GL1 and the second gate line terminal GL2, respectively; and the first switch S1, the second switch S2, the third switch S3, the fourth switch S4, the fifth switch S5 and the sixth switch S6 are controlled to be turned off, so that the signal from the first voltage terminal ELVDD is written to the fourth node N4.

As shown in FIGS. 9*b* and 9*c*, a turn-off signal is input to the first gate line terminal GL1, the second gate line terminal GL2, the first switch S1, the second switch S2, the third switch S3, the fourth switch S4, the fifth switch S5, and the sixth switch S6, so that the second transistor T2, the third transistor T3, the first switch S1, the second switch S2, the third switch S3, the fourth switch S4, the fifth switch S5, and the sixth switch S6 are turned off. In this case, the first transistor T1 is turned on due to the storage function of the storage capacitor Cst in the previous phase, and a current, caused by the signal from the first voltage terminal ELVDD, flows through the first transistor T1, so that the voltage at the fourth node N4 is continuously increased.

In step S34 (i.e., a stabilization phase c3), a turn-on signal is input to the gate of the second transistor T2 via the first gate line terminal GL1; a turn-on signal is not written to the gate of the third transistor T3 via the second gate line terminal GL2; the first switch S1, the second switch S2, the third switch S3, the fourth switch S4, the fifth switch S5 and the sixth switch S6 are controlled to be turned off; and a fourth data signal is input to the first electrode of the second transistor T2 via the data line terminal DL, so that a voltage at the fourth node N4 is kept stable.

That is, a turn-off signal is input to the second gate line terminal GL2, the first switch S1, the second switch S2, the third switch S3, the fourth switch S4, the fifth switch S5, and the sixth switch S6, so that the third transistor T3, the first switch S1, the second switch S2, the third switch S3, the fourth switch S4, the fifth switch S5, and the sixth switch S6 are turned off. A turn-on signal is input to the gate of the second transistor T2 via the first gate line terminal GL1, so that the second transistor T2 is turned on. The fourth data signal having a voltage of OV is input to the first electrode of the second transistor T2 via the data line terminal DL, so that the first transistor T1 is turned off, and the voltage at the fourth node N4 remains unchanged.

In step S36 (i.e., a third sensing phase c4), a turn-on signal is written to the gate of the third transistor T3 via the second gate line terminal GL2; a turn-on signal is not input to the gate of the second transistor T2 via the first gate line terminal GL1; the first switch S1, the third switch S3 and the fourth switch S4 are controlled to be turned on, and the second switch S2, the fifth switch S5 and the sixth switch S6 are controlled to be turned off, so that the voltage at the fourth node N4 is written to the integration capacitor Cfb. The luminous efficiency of the light emitting unit 1 is calculated according to the capacitance of the integration capacitor and the voltage at the fourth node.

As shown in FIG. 9*b*, a turn-off signal is input to the first gate line terminal GL1, the second switch S2, the fifth switch S5 and the sixth switch S6, so that the second transistor T2, the second switch S2, the fifth switch S5 and the sixth switch S6 are turned off. A turn-on signal is input to the second gate line terminal GL2, the first switch S1, the third switch S3, and the fourth switch S4, so that the third transistor T3, the first switch S1, the third switch S3, and the fourth switch S4 are turned on, and thus, the voltage at the fourth node N4 is written into the integration capacitor Cfb via the fourth switch S4, and the luminous efficiency of the light emitting unit 1 is derived according to the capacitance of the integration capacitor Cfb and the voltage at the fourth node.

It should be noted that, in the present disclosure, relational terms, such as "first" and "second", and the like, are used merely to distinguish one entity or action from another entity or action without necessarily requiring or implying any actual such relationship or order between such entities or actions. Also, the terms "comprise," "include," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element defined by the phrase "comprising a . . . . . ." does not exclude the presence of other identical elements in the process, method, article, or apparatus that comprises the element.

In accordance with the embodiments of the present disclosure, as set forth above, these embodiments are not intended to be exhaustive or to limit the disclosure to the specific embodiments described. Obviously, many modifications and variations are possible in light of the above description. The embodiments were chosen and described in order to best explain the principles and the practical application of the present disclosure, to thereby enable one of ordinary skill in the art to make a better use of the present disclosure and the modified use on the basis of the present disclosure. The present disclosure is to be limited only by the claims and their full scope and equivalents.

What is claimed is:

1. A sensing circuit, comprising: an operation amplifier, an integration capacitor, a first switch, a second switch, a third switch, a fourth switch, a fifth switch, and a sixth switch, wherein the operation amplifier has an in-phase input terminal connected to a first node via the first switch, an anti-phase input terminal connected to a second node, and an output terminal connected to a third node;

the integration capacitor has a first electrode connected to the second node, and a second electrode connected to the third node;

the first node is connected to a sensing line via the second switch, and is connected to a first signal terminal via the third switch;

the second node is connected to the sensing line via the fourth switch, and is connected to a second signal terminal via the fifth switch;

the third node is connected to a signal output terminal of the sensing circuit; and the second node is connected to the third node via the sixth switch, wherein the first signal terminal is configured to provide a constant voltage signal, and the second signal terminal is configured to provide a constant current signal; and correction for the operation amplifier and the integration capacitor can be achieved according to signals provided from the first signal terminal, the second signal terminal and the sensing line, and a combination of turn-on states and turn-off states of the first switch, the second switch, the third switch, the fourth switch, the fifth switch, and the sixth switch.

2. The sensing circuit of claim 1, further comprising:

an analog-to-digital converter having a first terminal connected to the third node and a second terminal connected to the signal output terminal of the sensing circuit.

3. A pixel driving module, comprising the sensing circuit of claim 1 and a pixel circuit, wherein the pixel circuit comprises a driving unit, a light emitting unit, a data writing unit, a storage unit, and a sensing unit, wherein the driving unit has a control terminal connected at a fifth node to a second terminal of the data writing unit and a first terminal of the storage unit, a first terminal connected to a first voltage terminal, and a second terminal connected at a fourth node to a first terminal of the light emitting unit, a first terminal of the sensing unit and a second terminal of the storage unit;

the data writing unit has a control terminal connected to a first gate line terminal and a first terminal connected to a data line terminal;

the light emitting unit has a second terminal connected to a second voltage terminal; and the sensing unit has a control terminal connected to a second gate line terminal, and a second terminal connected to the sensing line.

4. The pixel driving module of claim 3, wherein the driving unit comprises: a first transistor having a gate used as the control terminal of the driving unit and connected to the fifth node, a first electrode used as the first terminal of the driving unit and connected to the first voltage terminal, and a second electrode used as the second terminal of the driving unit and connected to the fourth node;

the data writing unit comprises: a second transistor having a gate used as the control terminal of the data writing unit and connected to the first gate line terminal, a first electrode used as the first terminal of the data writing unit and connected to the data line terminal, and a second electrode used as the second terminal of the data writing unit and connected to the fifth node;

the storage unit comprises: a storage capacitor having a first electrode used as the first terminal of the storage unit and connected to the fifth node, and a second electrode used as the second terminal of the storage unit and connected to the fourth node;

the light emitting unit comprises: a first electrode used as the first terminal of the light emitting unit and connected to the fourth node, and a second electrode used as the second terminal of the light emitting unit and connected to the second voltage terminal; and the sensing unit comprises: a third transistor having a gate used as the control terminal of the sensing unit and connected to the second gate line terminal, a first electrode used as the first terminal of the sensing unit and connected to the fourth node, and a second electrode used as the second terminal of the sensing unit and connected to the sensing line.

5. A display apparatus, comprising the pixel driving module of claim 4, wherein the display apparatus further comprises: a display panel, a timing controller, a source driver, a gate driver, and a memory;

the display panel is connected to the source driver and the gate driver, the timing controller is connected to the source driver, the gate driver, and the memory, the sensing circuit in the pixel driving module is in the source driver, the pixel circuit in the pixel driving module is in the display panel, and a threshold voltage and mobility of the first transistor, and luminous efficiency of the light emitting unit are stored in the memory.

6. A correction method for the sensing circuit of claim 2, comprising:

supplying a first voltage signal from the first signal terminal to the anti-phase input terminal and the output terminal of the operation amplifier by controlling the second switch, the third switch, the fourth switch and the sixth switch to be turned on and the first switch and the fifth switch to be turned off;

acquiring a first digitized output voltage signal at the second terminal of the analog-to-digital converter; and calculating a correction value of the analog-to-digital converter according to a first digitized voltage signal obtained after performing digital processing on the first voltage signal and the first digitized output voltage signal.

7. The correction method of claim 6, further comprising:

calculating a correction value of the operation amplifier, which comprises:

supplying a second voltage signal from the first signal terminal to the in-phase input terminal of the operation amplifier by controlling the first switch, the third switch and the sixth switch to be turned on, and the second switch, the fourth switch and the fifth switch to be turned off;

acquiring a second digitized output voltage signal at the second terminal of the analog-to-digital converter; and calculating a correction value of the operation amplifier according to a second digitized voltage signal obtained after performing digital processing on the second voltage signal, the second digitized output voltage signal and the correction value of the analog-to-digital converter.

8. The correction method of claim 6, further comprising calculating a correction value of the integration capacitor, which comprises:

supplying a third voltage signal from the first signal terminal to the in-phase input terminal of the operation amplifier and supplying a first current signal from the second signal terminal to the integration capacitor and the anti-phase input terminal of the operation amplifier by controlling the first switch, the third switch and the fifth switch to be turned on and the second switch, the fourth switch and the sixth switch to be turned off;

acquiring a third digitized output voltage signal at the second terminal of the analog-to-digital converter and a third digitized input voltage signal at the first terminal of the analog-to-digital converter; and calculating a correction value of the integration capacitor according to a third digitized voltage signal obtained after performing digital processing on the third voltage signal, the third digitized output voltage signal, the third digitized input voltage signal, and a capacitance of the integration capacitor.

9. A correction method for the sensing circuit of claim 1, comprising:

supplying a second voltage signal from the first signal terminal to the in-phase input terminal of the operation amplifier by controlling the first switch, the third switch and the sixth switch to be turned on and the second switch, the fourth switch and the fifth switch to be turned off;

acquiring a second output voltage signal at the output terminal of the operation amplifier; and calculating a correction value of the operation amplifier according to the second voltage signal and the second output voltage signal.

10. A correction method for the sensing circuit of claim 1, comprising:

supplying a third voltage signal from the first signal terminal to the in-phase input terminal of the operation amplifier, and supplying a first current signal from the second signal terminal to the integration capacitor and the anti-phase input terminal of the operation amplifier, by controlling the first switch, the third switch, and the fifth switch to be turned on and the second switch, the fourth switch, and the sixth switch to be turned off;

acquiring a third output voltage signal at the output terminal of the operation amplifier; and calculating a correction value of the integration capacitor according to the third voltage signal, the third output voltage signal, and a capacitance of the integration capacitor.

11. A sensing method of a threshold voltage of the pixel driving module of claim 4, comprising:

in a first reset phase, inputting a turn-on signal to the gate of the second transistor and the gate of the third transistor via the first gate line terminal and the second gate line terminal, respectively; controlling the second switch and the third switch to be turned on and the first switch, the fourth switch, the fifth switch and the sixth switch to be turned off; and inputting a first data signal to the first electrode of the second transistor via the data line terminal, such that a signal from the first signal terminal is written into the sensing line to reset the sensing line, and the first data signal is written into the storage capacitor;

in a first charging phase, inputting a turn-on signal to the gate of the second transistor and the gate of the third transistor via the first gate line terminal and the second gate line terminal, respectively; controlling the first switch, the second switch, the third switch, the fourth switch, the fifth switch and the sixth switch to be turned off, such that a signal from the first voltage terminal is written into the sensing line; and in a first sensing phase, controlling the fourth switch and the sixth switch to be turned on and the first switch, the second switch, the third switch and the fifth switch to be turned off without inputting a turn-on signal to the gate of the second transistor and the gate of the third transistor via the first gate line terminal and the second gate line terminal, respectively; and acquiring a voltage signal at the output terminal of the operation amplifier, so as to calculate a threshold voltage of the first transistor according to the first data signal and the voltage signal at the output terminal of the operation amplifier.

12. The sensing method of claim 11, further comprising:

inputting the voltage signal at the output terminal of the operation amplifier to an analog-to-digital converter to convert the voltage signal at the output terminal of the operation amplifier into a digitized voltage signal, and calculating the threshold voltage of the first transistor according to a first digitized data signal obtained after performing digital processing on the first data signal and the digitized voltage signal at the output terminal of the operation amplifier.

13. A sensing method of mobility of the pixel driving module of claim 4, comprising:

in a second reset phase, inputting a turn-on signal to the gate of the second transistor and the gate of the third transistor via the first gate line terminal and the second gate line terminal, respectively; controlling the second switch and the third switch to be turned on and the first switch, the fourth switch, the fifth switch and the sixth switch to be turned off; and inputting a second data signal to the first electrode of the second transistor via the data line terminal, such that a signal from the first signal terminal is written to the sensing line and the second data signal is written to the storage capacitor;

in a second charging phase, inputting a turn-on signal to the gate of the third transistor via the second gate line terminal; not inputting a turn-on signal to the gate of the second transistor via the first gate line terminal; and controlling the first switch, the second switch, the third switch, the fourth switch, the fifth switch and the sixth switch to be turned off, such that a signal from the first voltage terminal is written to the sensing line; and in a second sensing phase, controlling the first switch, the third switch and the fourth switch to be turned on and the second switch, the fifth switch and the sixth switch to be turned off; not inputting a turn-on signal to the gate of the second transistor and the gate of the third transistor via the first gate line terminal and the second gate line terminal, respectively; and acquiring a voltage signal at the output terminal of the operation amplifier, so as to calculate the mobility of the first transistor according to the second data signal and the voltage signal at the output terminal of the operation amplifier.

14. The sensing method of claim 13, further comprising:

inputting the voltage signal at the output terminal of the operation amplifier to an analog-to-digital converter to convert the voltage signal at the output terminal of the operation amplifier into a digitized voltage signal, and calculating the mobility of the first transistor according to a second digitized data signal obtained after performing digital processing on the second data signal and the digitized voltage signal at the output terminal of the operation amplifier.

15. A sensing method of luminous efficiency of the light emitting unit of the pixel driving module of claim 5, comprising:

in a third reset phase, controlling the second switch and the third switch to be turned on and the first switch, the fourth switch, the fifth switch and the sixth switch to be turned off; inputting a turn-on signal to the gate of the second transistor via the first gate line terminal; not inputting a turn-on signal to the gate of the third transistor via the second gate line terminal, and inputting a third data signal to the first electrode of the second transistor via the data line terminal, such that a signal from the first signal terminal is written to the sensing line, and the third data signal is written to the storage capacitor;

in a third charging phase, not inputting a turn-on signal to the gate of the second transistor and the gate of the third transistor via the first gate line terminal and the second gate line terminal, respectively; and controlling the first switch, the second switch, the third switch, the fourth switch, the fifth switch and the sixth switch to be turned off, such that a signal from the first voltage terminal is written to the fourth node;

in a stabilization phase, inputting a turn-on signal to the gate of the second transistor via the first gate line terminal, and not inputting a turn-on signal to the gate of the third transistor via the second gate line terminal; controlling the first switch, the second switch, the third switch, the fourth switch, the fifth switch and the sixth switch to be turned off; and inputting a fourth data signal to the first electrode of the second transistor via the data line terminal, so as to maintain a voltage at the fourth node stable; and in a third sensing phase, inputting a turn-on signal to the gate of the third transistor via the second gate line terminal, and not inputting a turn-on signal to the gate of the second transistor via the first gate line terminal; controlling the first switch, the third switch and the fourth switch to be turned on and the second switch, the fifth switch and the sixth switch to be turned off, such that the voltage at the fourth node is written to the integration capacitor, and the luminous efficiency of the light emitting unit is calculated according to a capacitance of the integration capacitor and the voltage at the fourth node.

* * * * *